UNITED STATES PATENT OFFICE.

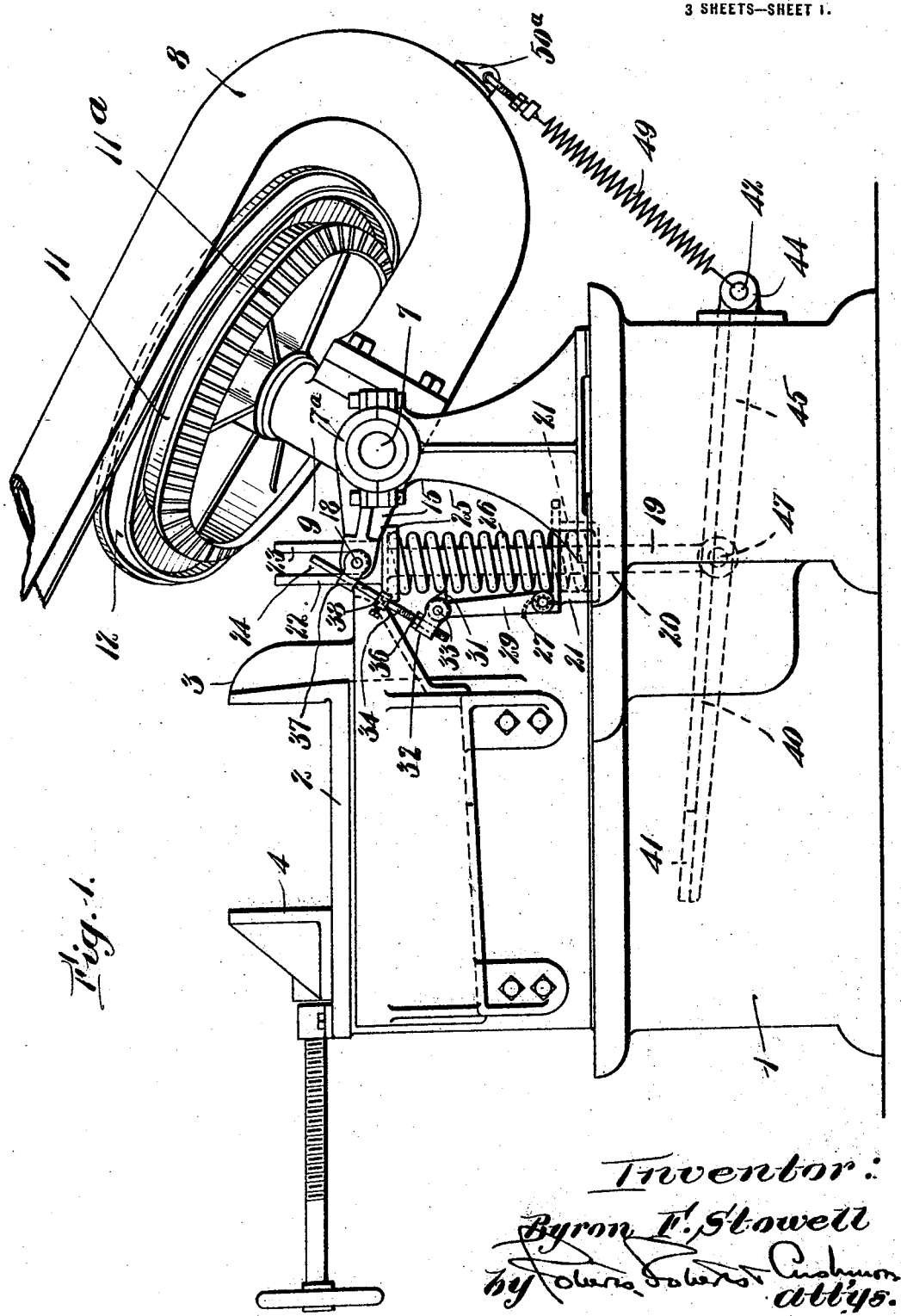

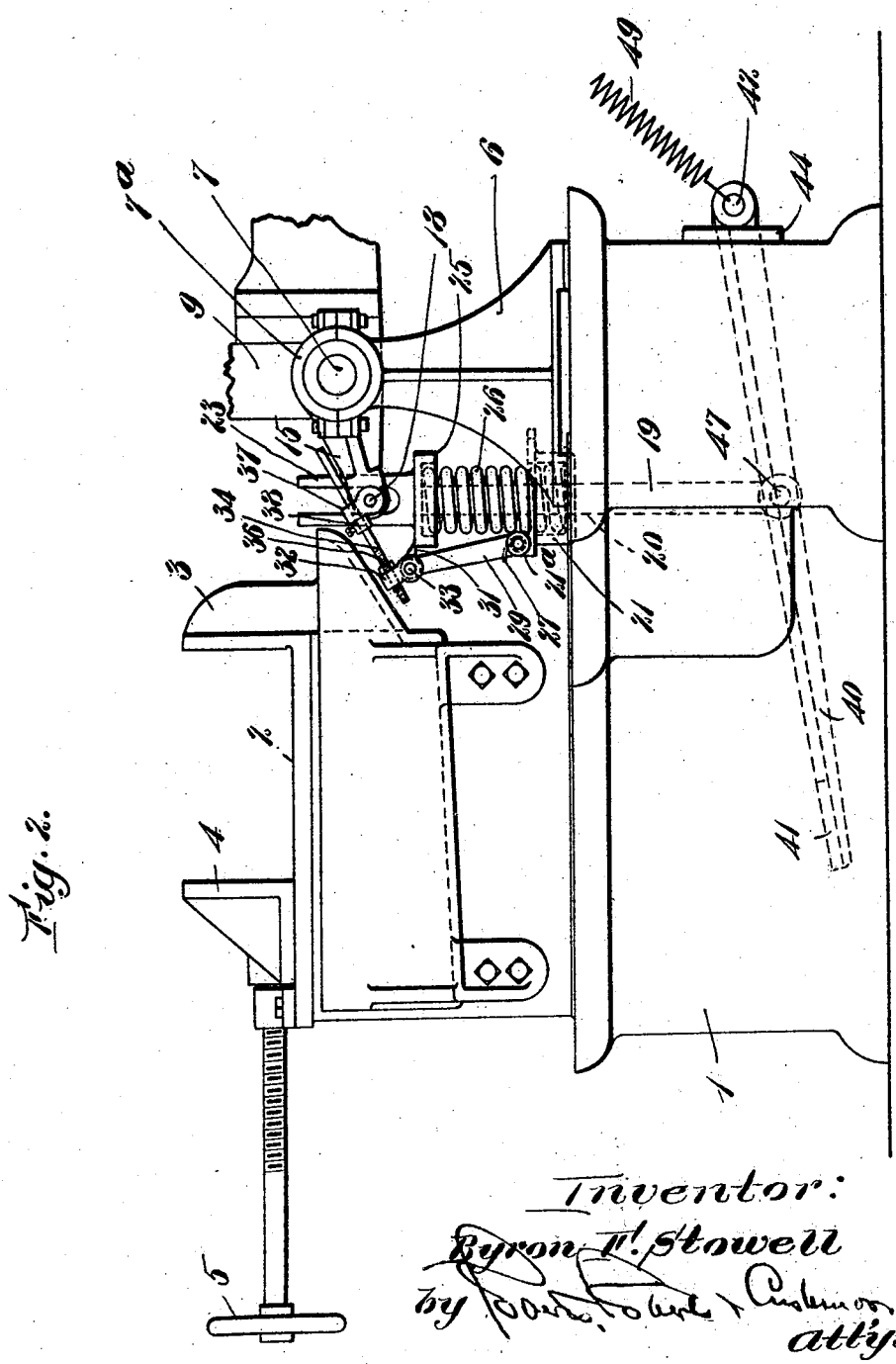

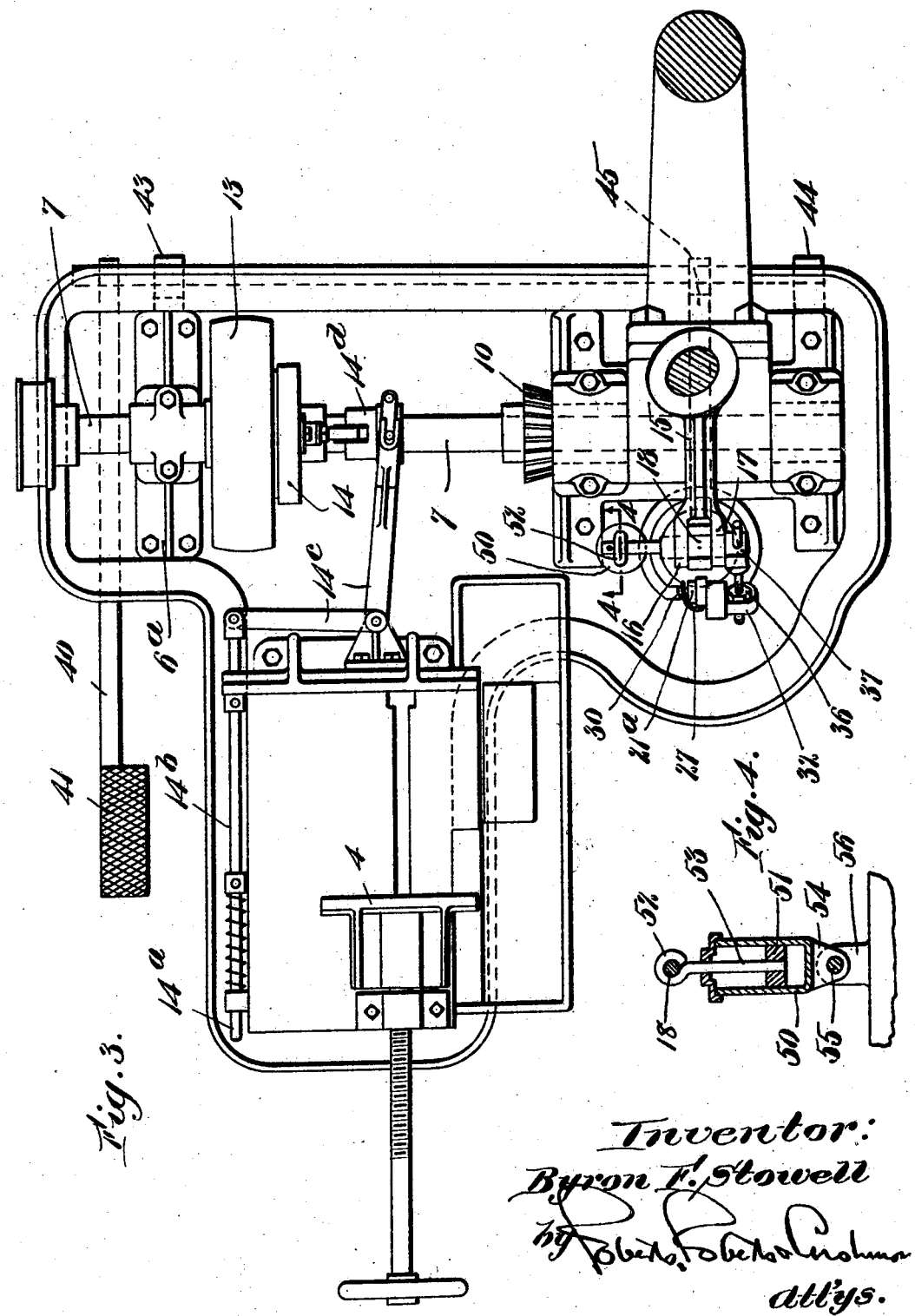

BYRON F. STOWELL, OF SPRINGFIELD, MASSACHUSETTS, ASSIGNOR TO METAL SAW AND MACHINE CO., INC., OF SPRINGFIELD, MASSACHUSETTS, A CORPORATION OF MASSACHUSETTS.

CONTROL DEVICE FOR CUTTING MACHINES.

1,414,230.  Specification of Letters Patent.  Patented Apr. 25, 1922.

Application filed December 20, 1920. Serial No. 431,860.

*To all whom it may concern:*

Be it known that I, BYRON F. STOWELL, citizen of the United States of America, and resident of Springfield, in the county of Hampden and State of Massachusetts, have invented new and useful Improvements in Control Devices for Cutting Machines, of which the following is a specification.

This invention relates to power cutting machines including sawing machines employing an endless band saw as the cutting instrumentality.

In cutting machines of the kind in which the tool is moved toward the work, and especially in metal sawing machines of a successful type in which an endless band saw blade is driven in a relatively heavy frame mounted for motion in a downward direction past a suitable work support to feed the edge of the saw into the work, it is usual to permit an unbalanced portion of the weight of the pivoted frame to measure the pressure on the saw for feeding the saw through the work. It is desirable automatically to limit the descent of the frame to determine the depth of cut, or to prevent further descent after the saw has passed through the work when used for cutting-off operations. Otherwise the running saw might strike the work support or other portion of the machine frame, and cause injury or breakage if the operator is inattentive. The saw frame as usually arranged must be raised by hand after the completion of one sawing operation to permit the adjustment or replacement of the work. This not only consumes the time and requires the attention of the operator, but when the frame remains in its lowered position after the operation is finished, the operator often is unaware of the completion of the operation until after the lapse of considerable time, thus wasting the time of the machine.

One object of the present invention is to provide automatically acting means of an improved type for stopping the downward travel of the saw frame substantially coincident with the completion of the kerf, or emergence of the cutting edge of the saw from the lower surface of the work.

A further object of the invention is to provide for the automatic return of the saw frame to the up, or work-receiving position, at the completion of the cutting operation.

During the downward swing of the saw frame by the hand of the operator to bring the saw into work engaging position, as well as during its automatically controlled upward movement, it is desirable to avoid rapid or violent motion whereby the saw or saw frame might be damaged. A further object of the invention is to provide against the occurrence of damage due to such cause and to this end to contrive means for controlling the rate of motion of the saw frame.

The invention provides means for accomplishing these objects. One preferred mode of effecting these objects is shown in the accompanying drawings in which—

Figure 1 is a side elevation of a machine of the type referred to showing one application of the invention, certain parts being broken away and the saw-frame being indicated as in its upper or idle position;

Figure 2 is a similar view showing the position of the parts when the saw frame is about to be returned to starting position;

Figure 3 is a plan view partly in section showing the entire machine; and

Figure 4 is a detail section on line 4—4 of Fig. 3.

The main frame 1 of the machine has a work support 2 comprising the relatively fixed clamping jaw 3 and a movable clamping jaw 4 with the hand wheel 5 for actuating the latter.

As herein disclosed, the work holding device is of a type particularly adapted for holding metal, but it is clear that if the machine be intended for sawing wood or similar material, suitable work holding means of usual form may be substituted for that herein illustrated. A bracket 6 is secured to the frame of the machine to provide bearings for a trunnion sleeve $7^a$ in which the drive shaft 7 is mounted to turn. The sleeve $7^a$ is integral with or attached rigidly to the saw frame 8. An angular bearing sleeve 9, integral, if desired, with the sleeve $7^a$ serves to provide a journal bearing for the shaft for the saw driving wheel 11 rotating on the upper end of such shaft. Wheel 11 has a saw engaging face 12 and the bevel gear teeth $11^a$. The drive shaft 7 extends across the base through a bearing bracket $6^a$ within which a drive pulley 13 is arranged to be clutched by a clutch 14 to shaft 7 when worked by any convenient manually operated shipper, such as handle 14ª, pull rod 14ᵇ, bell crank 14ᶜ and sliding clutch-collar 14ᵈ. The primary drive pinion 10 meshing with the gear teeth 11ª is keyed to shaft 7 to drive the wheel 11 whenever the clutch 14 is engaged.

Keyed to or integral with the sleeve 7ª is a rigid arm 15 bifurcated at its outer extremity to form spaced members 16, 17. Secured in said members is a rod or pin 18.

The pivoted saw frame may be provided with a spring motor cooperating with a rigid arm on the saw frame having a part movable freely in a slot at the upper end of a vertically movable rod worked by the spring. A relatively heavy spring may be employed for raising the rod to bring the lower wall of the slot into forcible contact with the part carried by the arm, to swing the frame into its up or inoperative position. The spring-actuated rod may be restored to its inoperative original position, without affecting the saw frame, by manual means such as a treadle having connections to the lower end of the rod. When in depressed position the rod may be retained by a suitable latch having engagement with a portion of the rod.

In the lowest intended position of the frame, or after the passage of the saw completely through the work, further motion of the frame may be prevented by causing the spring-motor to lift it. At latch releasing element operated at a predetermined point of the motion of the frame may be relied upon to release the energy stored in the spring motor to swing the saw frame into its up or inoperative position, thus withdrawing the saw, notifying the operator of the completion of the work, and preventing damage to the machine or saw.

A rod 19, for instance, is arranged to slide vertically through an opening 20 in the machine frame and through a cup bracket 21 fast upon the upper surface of the frame. At its upper end the rod 19 is slotted at 24 to provide a pair of spaced parallel arms 22, 23. The pin or rod 18 passes through the slot 24 and is freely movable longitudinally thereof. At a point below the lower end of the slot 24, the rod 19 is provided with a fixed flanged collar 25. The coiled compression spring 26 encircles the rod 19 intermediate the member 21 and the collar 25. A latch member 29 pivoted between lugs 21ª of the member 21 or other suitable fixed point has a beveled latch dog or projection at 31, and is urged to the right, Figs. 1 and 3, to take over the collar 25, by a light spring 27. The latch 29 is arranged to be released by means depending on the position of the frame 8, and adapted for accurate adjustment. A shackle 32 pivoted at 33, for instance, to the upper end of the member 29, is bored and threaded to receive a screw-threaded stop-rod 34 passing freely through a bore in a similar shackle 37, and is provided with an adjustable set-screw stop collar 38 to take against shackle 37, which is pivotally mounted upon the rod or pin 18. The effective length of the stop rod may be adjusted roughly by collar 38, and accurately by screwing rod 34 into and out of shackle 32. A lock-nut 36 is provided to retain the adjusted position. Obviously any means for adjusting the effective position of stop 38 will determine the point in the descent of arm 15 at which the latch 29 will be released from collar 25.

The spring 26 is compressed before starting a cut. A lever 40, having a tread portion 41, is fixedly secured to the left hand extremity of a rock shaft 42 in bearings at 43, 44, on the machine frame. The shaft 42 has secured thereto a lever member 45 bifurcated at its forward extremity to receive the lower end of the rod 19 and bored for a pivot pin 47 connecting the rod 19 and the lever member 45.

The frame 8 may be partly counterbalanced by spring 49 secured to a suitable projection 50ª of the frame 8, the lower end of such spring being connected to the machine frame at any desired point.

In order to control the rate of movement of the frame 8 downward when released by operation of the treadle 40 and rod 19, or upward when the spring 26 is active, any suitable form of retarding or impeding device may be provided to prevent too rapid motion in either direction. Preferably the pin 18 is extended on one side and reduced as shown to take into an eye 52 in the piston-rod 53 of a dash-pot 50. In the preferred form shown, this dash-pot is a cast metal cylinder closed at the bottom and having bored lugs 54 for a pin 55 bearing in lugs 56 fast to frame 1. The piston 51 is without packing, and the air leakage about it is such as to limit the rate of motion of the frame 8 to a desired maximum.

In operation, assuming that the parts occupy the position shown in Fig. 1, and work to be cut being in place between the jaws 3 and 4, the operator treads on lever 40, 41, thus depressing the rod 19 and collar 25, and compressing spring 26 until dog 31 locks over collar 25. During such movement the fork 22, 23 of rod 19 slides downward relative to the pin 18 and frame 8, which the operator holds up substantially in the position shown in Fig. 1, or allows to fall as restrained by dash-pot 50 to bring the saw against the work. The frame now acts by gravity of so much of frame 8 as is not counterbalanced by spring 49 to feed the saw into the work and the operator after manipulating the clutch handle 14ª to start the saw, may give his attention to other duties while the machine continues to operate. As arm 15 sweeps down toward the position of Fig. 2, the shackle 37 approaches and finally contacts with the collar 38 on the rod 34. Any further downward movement of the saw frame swings the member 29 upon its pivot sufficiently to carry the dog 31 out of engagement with the collar 25. The spring 26 is thus released to force the lower end of the slot 24 into engagement with the rod 18 and thereby through arm 15 to swing the saw frame upwardly into the inoperative position indicated in Fig. 1. This position indicates to the operator, without close attention, that the machine has finished its operation, and thus enables one operator to attend to several machines or other work without waste of time.

While the devices herein described are preferred forms, minor variations for particular purposes will occur to those skilled in the art, without additional disclosure, which might be adopted without departing from the invention.

It will be observed that the automatic control of the operation of a power saw by the described devices is secured by substantial and durable machine elements without employing any elaborate mechanism, or any parts requiring to be made to refined dimensions.

I claim:—

1. A metal cutting machine having therein a work-support, a cutter, and means for driving the cutter, means for causing the cutter to approach the work on the work-support and to feed into the work; a spring-motor and connections thereto adapted to return the cutter to its initial position, and means to restrain the spring-motor from action adapted to be released at a predetermined position of the cutter.

2. A metal cutting machine having therein a work-support, a cutter, and means for driving the cutter, means for causing the cutter to approach the work on the work-support and to feed into the work; a spring-motor and connections thereto adapted to return the cutter to its initial position, manually operated means for energizing the spring-motor preparatory to operation of the cutter, and means to restrain the spring-motor from action adapted to be released at a predetermined position of the cutter.

3. A metal cutting machine comprising a cutter supporting frame, means for driving the cutter, a work-support, means for supporting said frame for movement toward and from the work-support, a spring-motor for moving said frame away from the work-support, and manually controllable devices for rendering said motor temporarily inoperative in a state of potential activity.

4. A metal cutting machine having a gravity actuated cutter frame, means for moving said frame in opposition to gravity, and automatically actuable devices for rendering said moving means operative to so move the frame upon completion of a cut in the work of predetermined depth.

5. A metal sawing machine having a pivoted saw frame, a spring for moving said frame away from the work, means for placing and holding said spring under compression, and automatically actuable means for releasing said spring at the completion of the sawing operation whereby to move said frame and the saw away from the work.

6. A metal cutting machine, comprising in combination a work-support, a frame pivotally mounted whereby to permit a cutter blade carried thereby to be moved toward such work-support, spring means for swinging said frame away from the work support, means for placing said spring under compression, and a retaining device for maintaining said spring under compression during the operation of said cutter upon work held in said support.

7. A metal cutting machine, comprising in combination a work-support, a frame pivotally mounted whereby to permit a cutter blade carried thereby to be moved toward such work-support, spring means for swinging said frame away from the work-support, means for placing said spring under compression, and a retaining device for maintaining said spring under compression during the operation of said cutter upon work held in said support, and means for retarding the swinging motion of said frame.

8. A metal-cutting machine having in combination a pivoted frame, a band saw carried thereby, means for driving the saw, a work-support, a spring-actuated abutment engageable with a part movable with said frame, means for locking said abutment against movement, and a device for automatically disengaging said locking means at a predetermined point in the motion of the saw frame whereby to cause said abutment to move said frame away from the work-support.

9. A band saw machine having in combination a work-support, a saw frame pivoted to swing about an axis to feed the saw into the work, an arm rigidly secured to said frame, a spring-motor operatively associated with said arm and adapted to move the latter and thereby to swing said frame away from the work-support, and a latch device for holding said spring-motor inoperative during a predetermined extent of operative feeding motion of the saw.

10. A metal cutting machine having therein a work-support, a frame movable toward and from the work-support, a cutter on the frame, and means for driving the cutter, in combination with a spring-motor for returning the frame to initial position comprising means having an abutment for driving engagement with a part carried by the frame, a spring adapted to be compressed in one position of said abutment, means for compressing the spring, a latch to hold the abutment when the spring is compressed, and an adjustable connection between the frame and the latch for releasing the latch at one limit of the motion of the frame.

11. In a metal sawing machine of the band-sawing type having a swinging saw-frame adapted to move the saw against the work by gravitating motion of the saw-frame about an axis, means for returning the saw frame to initial position comprising a rod disposed for longitudinal motion at one side of said axle, an eccentric abutment on the frame adapted to contact with the rod, a spring surrounding the rod, means for tensioning and holding under tension said spring, and means for releasing said holding means when said frame attains one limit of its swinging motion.

12. In a metal sawing machine of the band-sawing type having a swinging saw-frame adapted to move the saw against the work by gravitating motion of the saw-frame about an axis, means for returning the saw frame to initial position comprising a rod disposed for longitudinal motion at one side of said axis, an eccentric abutment on the frame adapted to contact with the rod, a spring surrounding the rod, means for tensioning and holding under tension said spring, and means for releasing said holding means when said frame attains one limit of its swinging motion, in combination with pneumatic means for retarding the motion of said frame in each direction.

13. In a machine of the class described, in combination a saw-frame pivotally supported to swing under gravity about a substantially horizontal axis, an arm rigidly secured to said frame, a slidably guided rod having a forked extremity for engaging a pin carried by said arm, a spring encircling said rod and normally tending to move said rod into operative engagement with said pin, manually operable means to move said rod in the opposite direction, and means for releasing the rod automatically to lift the saw frame.

14. A band saw machine having a pivotally supported saw frame and spring means for moving said frame in one direction, a manually operable means for tensioning said spring means, a latch for holding such means in tensioned condition, a connection extending from said latch, an abutment on said connection adjustable toward and away from the latch, and means supported by said frame and adapted to engage said abutment to move said latch whereby to release said spring.

15. A machine of the class described having a pivoted saw frame and a spring for swinging said frame to inoperative position, comprising in combination means for compressing said spring, a pivoted latch for holding said spring under compression, an adjustable rod secured to said latch, an abutment carried by said rod, and a guide member for the free end of said rod, said guide member being movable with said frame and arranged for contact with said abutment whereby to move said latch to release said spring.

16. In a machine of the class described and having a pivoted saw frame, in combination, an arm fast to said frame, a rod guided for sliding movement and having an open slot adjacent its extremity, a collar fast to said rod, a coil spring engaging below said collar whereby normally to lift said rod, a pin secured to said arm and seated within said open ended slot, and a treadle device having connections to the lower end of said rod whereby to depress the latter and compress said spring.

Signed by me at Springfield, Massachusetts, this seventeenth day of December, 1920.

BYRON F. STOWELL.